US008949310B2

(12) United States Patent
Savage

(10) Patent No.: US 8,949,310 B2
(45) Date of Patent: Feb. 3, 2015

(54) CLIENT OBJECT FOR USE IN A SELF-SERVICE TERMINAL

(75) Inventor: John G. Savage, Tayport (GB)

(73) Assignee: NCR Corporation, Duluth, GA (US)

( * ) Notice: Subject to any disclaimer, the term of this patent is extended or adjusted under 35 U.S.C. 154(b) by 2416 days.

(21) Appl. No.: 10/834,524

(22) Filed: Apr. 29, 2004

(65) Prior Publication Data

US 2004/0217163 A1 Nov. 4, 2004

(30) Foreign Application Priority Data

May 1, 2003 (GB) .................................. 0310072.4

(51) Int. Cl.
*G06F 15/16* (2006.01)

(52) U.S. Cl.
USPC .......................................................... 709/203

(58) Field of Classification Search
USPC .......................................... 709/203; 235/380
See application file for complete search history.

(56) References Cited

U.S. PATENT DOCUMENTS

| | | | | |
|---|---|---|---|---|
| 5,832,228 | A | 11/1998 | Holden et al. | |
| 5,962,830 | A * | 10/1999 | Wallace | 235/379 |
| 6,115,040 | A | 9/2000 | Bladow et al. | |
| 6,163,797 | A * | 12/2000 | Eckley et al. | 709/203 |
| 6,311,165 | B1 * | 10/2001 | Coutts et al. | 705/21 |
| 6,438,594 | B1 * | 8/2002 | Bowman-Amuah | 709/225 |
| 2002/0057694 | A1 * | 5/2002 | Kamo | 370/395.2 |
| 2002/0095480 | A1 * | 7/2002 | Drummond et al. | 709/218 |
| 2002/0099657 | A1 * | 7/2002 | Black et al. | 705/43 |
| 2002/0099658 | A1 * | 7/2002 | Nielsen et al. | 705/43 |
| 2002/0152145 | A1 * | 10/2002 | Wanta et al. | 705/35 |

FOREIGN PATENT DOCUMENTS

| | | | |
|---|---|---|---|
| EP | 1 229 506 | A1 | 8/2002 |
| GB | 2 363 238 | A | 12/2001 |
| WO | WO 98/24040 | | 6/1998 |
| WO | WO 01/057617 | A2 | 8/2001 |
| WO | WO 02/59787 | | 8/2001 |
| WO | WO 01/90850 | A2 | 11/2001 |

OTHER PUBLICATIONS

Gamma E et al: "Design Patterns Elements of Resusable Objects-Oriented Software", Design Patterns. Element of Resusable Object-Oriented Software, 1997, pp. 25-27, 139-149, 233-242, XP002261440.

(Continued)

*Primary Examiner* — Esther Benoit
(74) *Attorney, Agent, or Firm* — Joseph P. Mehrle

(57) ABSTRACT

A client object for use in a self-service terminal, such as an automated teller machine (ATM), is described. Also described is a system comprising a self service terminal and a service provider server (24), such as a CRM system, operable to communicate or provide services in a format that is incompatible with the client terminal. Between the client terminal (10) and the CRM server (24) is an intermediate processor (22), such as a web server, having an adapter or interface (20) that allows communication between the terminal (10) and the CRM server (24). The interface (20) is configured to pass to the terminal (10) a limited amount of information in a specific protocol. In particular, the interface (20) passes text, such as a word-based advertisement, to the terminal (10), which then assumes sole responsibility for the presentation of that text on a client terminal screen.

12 Claims, 5 Drawing Sheets

(56) References Cited

OTHER PUBLICATIONS

Box D et al: “Simple Object Access Protocol (SOAP), 1.1”, Internet Citation, [Online ], May 8, 2000, XP002163943. Retrieved from the Internet: URL:http://www.w3.org>, [retrieved on February 22, 2001].

Box et al., “Simple Object Access Protocol (SOAP) 1.1”, W3C Note May 8, 2000, http://www.w3.org/TR/2000/NOTE-SOAP-20000508/, pp. 1-35, Dec. 5, 2009.

* cited by examiner

CLIENT OBJECT FOR USE IN A SELF-SERVICE TERMINAL

BACKGROUND OF THE INVENTION

The present invention relates to a client object for use in a self-service terminal, such as an automated teller machine (ATM), or a non-cash kiosk. The invention also relates to a system and method for enabling a client/server dialogue between an end point terminal and a server environment. The invention has particular application to an ATM network implementing customer relationship management and/or personalization.

Various approaches are currently available for enabling a client/server dialogue between a self-service terminal and a server environment. These allow a dialogue controlled by the server to be presented to the consumer at the client station and therefore make functions and services available that are not supported directly by the client station. As an example, it is sometimes desirable to allow ATMs to communicate with a CRM server, which is able to provide personalized information to a consumer and/or advertising material that may be of interest to that consumer.

A problem with existing mechanisms is that they are fixed and dependant on the platform and software suite used in both the client and server infrastructures, i.e. they are hard-coded to communicate to particular server systems, such as bespoke customer relationship management (CRM) environments.

A further problem is that the responsibility for the presentation of information to the consumer is split between the client and the server, making them domain and engagement specific. As a particular example, at present most CRMs that are available are wholly responsible for the presentation of information on the self-service terminal. Since most systems that interact with conventional CRM systems are PC based, it is necessary to have full screen and processing functionality of a PC to access the CRM functionality. This is not possible in many self-service environments and in particular for most ATMs.

SUMMARY OF THE INVENTION

An object of the invention is to provide a mechanism for enabling a dialogue between a self-service terminal such as an ATM or retail station and a web server environment.

According to a first aspect of the present invention there is provided a client object for use with a self-service terminal, the object comprising:

- a first interface for communicating with a service provider server to retrieve information for presenting to a user of the terminal;
- a second interface for communicating with a control application within the terminal, where the control application controls the operation of the terminal, including presentation of information on a display as part of a transaction flow;
- where the object includes means for exposing properties via the second interface to allow the control application to determine what information should be presented based on the exposed properties, thereby enabling the control application to retain full control of what information is presented and how the information is presented.

This aspect of the present invention has the advantage that a self-service terminal can receive information from a remote server in a format that is not compatible with the terminal, and be able to view the information and render the information on the terminal's screen. Where an ATM is used, this enables an ATM to present content without requiring the ATM to have a Web browser installed.

This aspect of the invention also has the advantage that the ATM retains full control of the information presented on the ATM's display.

Preferably, the first interface comprises a web services interface implementing a simple object access protocol. The service provider server may include an adapter for transforming information in a format used by the server to information in a format used by the first interface.

Preferably, the second interface comprises properties including text for display, a recommended time for display, and a recommendation for whether the presentation of the information should be interruptible.

Preferably, the client object receives via the first interface a communication defining a set of properties, and exposes via the second interface a sub-set of the received set of properties.

According to a second aspect of the present invention there is provided a method of notifying a self-service terminal control application about information to be presented on a display of the terminal, the method comprising the steps of: receiving, from the control application, identification information about a user of the terminal; generating a session message; sending the session message to a service provider server; requesting from the service provider server first information for presenting to that particular user; notifying the control application when first information for presenting to that user has been received; parsing the received first information to prepare properties in a pre-defined format that are comprehensible by the control application; exposing the properties to the control application to allow the control application to determine what information is available for presenting to the user.

Preferably, the method includes the further steps of: receiving a message from the control application indicating how a user responded to the first information; sending a response message to the service provider server indicating how the user responded to the first information. This enables the client object to feedback information to the service provider server regarding the user's selection.

Preferably, the method includes the further steps of: receiving from the service provider server second information for presenting to that particular user; notifying the control application that second information for presenting to that user has been received; parsing the received second information to prepare properties in a pre-defined format that are comprehensible by the control application; and exposing the properties to the control application to allow the control application to determine what information is available for presenting to the user.

According to a third aspect of the present invention there is provided a computer readable medium having computer executable instructions carried thereon for implementing all of the steps of the second aspect of the invention.

According to a fourth aspect of the invention there is provided a self-service terminal having a controller comprising a control application for controlling the terminal's transaction flow including presentation of information to a user, and a client object for notifying the control application of information for presenting to a user; the terminal including: a first interface for communicating with an external service provider server to retrieve information for presentation to the user of the terminal; a second interface between the control application and the client object; where the object exposes properties via the second interface to allow the control application to determine what information should be presented based on the exposed properties, thereby enabling the control application to retain full control of what, if any, information is presented and how the information is presented.

According to a fifth aspect of the present invention there is provided a system for presenting information to a user at a self-service terminal, where the information is targeted at that user, the system comprising: a self-service terminal including a control application operable to receive information in a first format; a service provider server for providing services in a second format, incompatible with the first format; an adapter in communication with the service provider server and for transforming information from the second format used by the service provider server to a third format; and a client object in communication with the adapter and operable for receiving information in the third format and for exposing properties of the information to the control application in the first format; whereby, the terminal is able to receive information from an external source originating in a different format while retaining full control of what information is displayed to the user.

In one embodiment, the first format is a set of object properties and methods, the second format is a proprietary format, and the third format is a Web-services format, such as a simple object access protocol (SOAP).

In a preferred embodiment, the first format is a set of object properties and methods and is the interface between an ATM control application and a client object; the second format is a proprietary CRM server or database application program interface (API), and is the interface between an adapter and the CRM server or a database; and the third format is defined by a SOAP interface (encapsulated within a WSDL) and is the interface between the client object and the adapter. The adapter functions to convert a proprietary API from a CRM server or database system into a standard interface that can be accessed by the client object. This enables the same client object to be used with different CRM servers and database systems; only the adapter has to be changed.

According to a sixth aspect of the invention there is provided a system comprising:

- a self-service client terminal;
- a service provider processor or server operable to provide services, typically in a format that is incompatible with the client terminal, and
- an adapter or interface to allow communication between the client terminal and the service provider server.

As noted previously, when information is requested from most service provider servers, for example via the internet, the information is down-loaded in a layout and format that is controlled by the service provider. However, by providing an adapter for controlling communication between the client terminal and the service provider server, the server component can be abstracted from the details of how information is presented at the client terminal. In this way, the service provider server can be used merely to obtain information required by the client, without any presentation details.

Preferably, the client terminal is configured to receive text or information from the service provider processor or server via the adapter, and assume sole responsibility for the presentation of that text or information on a client terminal screen. By removing any input from the remote server into how the information is presented to the user, there is provided a very simple and straightforward mechanism for allowing a dialogue between an end point terminal such as an ATM and service provider functionality that would otherwise be incompatible with that end point terminal. This is particularly useful in the ATM and retail station environment where screen and keyboard functionality is very restricted when compared to that available in the standard PC environment that is used by most CRM servers currently available.

The client terminal may be configured to generate a session message for sending to the service provider processor via the adapter. The session message may indicate that a user has started to use that client terminal. The start session message may be generated when the user first interacts with the client terminal, for example, in the case of an ATM, this may be when the user enters his bank-card into the machine. The session message may indicate that a user has finished using that client terminal. The finish session message may be generated when the user stops interacting with the client terminal, for example, in the case of an ATM, this may be when the user removes his bank-card from the machine.

The client terminal may be configured to generate a request message for sending to the service provider processor via the adapter, the request message including a unique identifier for identifying the user.

The request message may also include one or more trigger points that are indicative of when information from the service provider can be presented to the user at the client terminal. The client terminal may select the trigger points depending on actions taken by the user at the terminal, for example the selection of particular features or transactions.

The service provider may be configured to construct a response to a request message received from the client terminal. The service provider response may include text that is to be presented at the client terminal, wherein the client terminal has sole responsibility for the format and/or layout of the text presented. The service provider response may include means for identifying times when the information should be presented and/or means for identifying whether the information that is to be presented is interruptible and/or a recommended display time and/or means for identifying graphics that are stored at the client terminal.

The service provider response may include means for identifying interactive options for soliciting a response from the user at the client terminal. In this case, the client terminal may be configured to present user selectable features that correspond to the interactive options included in the service provider response.

The client terminal may be configured to recognize a feature selected by the user and send a message indicative of this selection to the service provider server via the adapter.

The client terminal may be connected to a host terminal, preferably wherein the host terminal is operable to provide financial services, so that other functionality can be provided at the client terminal by the host terminal. Preferably information provided by the service provider, for example a CRM server, is presented during periods between actions associated with financial transactions, for example during intervals between dialogue between the client terminal and the host terminal. For example, when the client terminal is an ATM, information may be presented to the user in the time between requesting cash and receiving that cash.

It will be appreciated that this aspect of the present invention allows a client terminal to provide functionality from both the service provider and the host terminal.

According to a seventh aspect of the invention, there is provided a client terminal such as an ATM or a retail station for use in the system in which the sixth aspect of the invention is embodied, the terminal being configured to:

- open communications with a remote processor or server via a dedicated adapter, the remote processor being configured to provide services in a format that is incompatible with the client terminal, and receive information from the remote processor via the dedicated web server adapter.

Preferably, the client terminal is configured to assume sole responsibility for the presentation of that information on the screen, and cause the information to be presented in a determined layout and/or format. The client terminal is also operable to construct messages for sending to the remote server with the adapter.

Preferably, the client terminal is configured to communicate with a host terminal, preferably wherein the host terminal is operable to provide financial services.

The client terminal may be configured to determine how and/or when information from the service provider server is interlaced with information from the host terminal. Interlacing refers to incorporating information from one source (for example, a web server) into information from another source (for example, transaction screens resident in the ATM or downloaded from the host).

The client terminal may be configured to determine when information is presented as a function of a user selection of services. Hence, for example, if the user has selected say a "withdraw cash" option, the client terminal may be configured to display on-screen information from the service provider server in the delay between the user making the request for a withdrawal and the actual dispensing of the cash.

Alternatively or additionally, the client terminal may include a printer and may be configured to provide a print-out of information from the service provider and/or host terminal. Again the layout of this information would be devised or determined by the client terminal, as would how it is presented relative to information provided by the host terminal.

According to an eighth aspect of the invention, there is provided a computer program preferably on a data carrier or computer readable medium, the computer program being for use in a client terminal such as an ATM or a retail station and having code or instructions for:

opening communications with a remote processor or server via a dedicated adapter or interface, such as a web server interface, receiving information from the remote processor via the dedicated web server adapter or interface, the information including no presentational information, and assuming responsibility for the presentation of that information on the screen.

BRIEF DESCRIPTION OF THE DRAWINGS

Various aspects of the invention will now be described by way of example only and with reference to the following drawings, of which.

DETAILED DESCRIPTION

Figure 1:
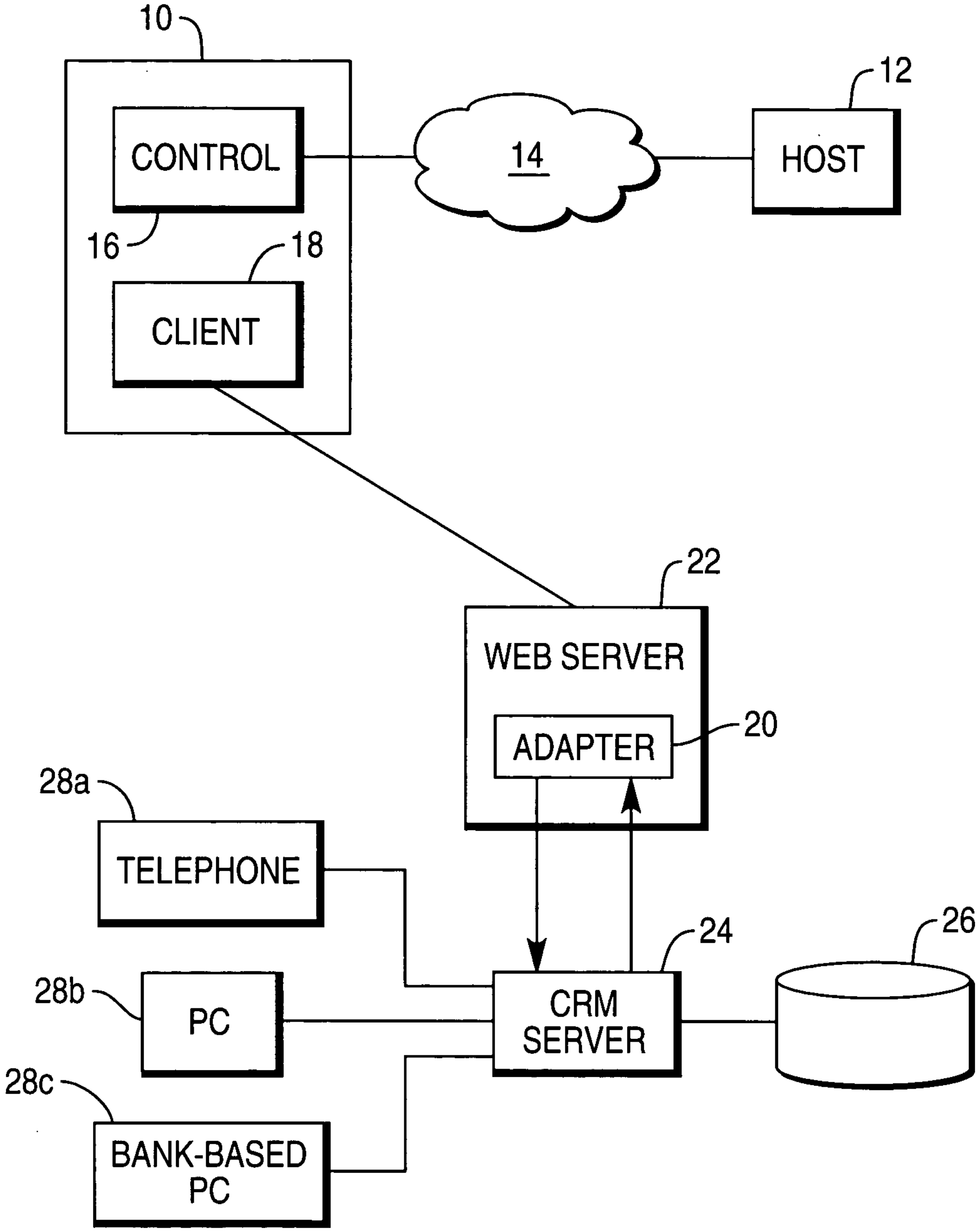
FIG. 1 is a block diagram of a system for allowing a dialogue between an ATM and a CRM server.

FIG. 1 shows an ATM 10 that can communicate with a host 12 via a network 14, typically a secure banking intranet. As is standard, the host 12 is able to provide authorization and transactional information to the ATM 10 to allow its standard transactional functionality to be performed, such as dispensing cash or receiving customer deposits. Provided in the ATM 10 is an ATM control application 16 operable to control most of the functionality of the terminal, such as communicating with the host 12, presenting information on a display (not shown) and responding to user keystrokes. Also included in the ATM 10 is a client object application 18. This client object 18 communicates with the ATM control application 16 and additionally a web service component or adapter 20 executing in a remote web server 22.

The client object application 18 is a software object that has two interfaces. The interface to the ATM control application 16 exposes a set of properties and methods. The interface to the adapter 20 is defined by a SOAP interface (encapsulated within a Web Services Description Language (WSDL)).

The web service adapter 20 communicates with a CRM server 24, which is operable to provide services such as advertising information or customer personalization details.

The Web service adapter 20 is specific to the particular CRM server 24 being used, because the Web service adapter 20 has a proprietary interface to the CRM server 24, which is the CRM server's application program interface (API). Suitable CRM servers include those provided by Broadvision (trade mark), Siebel (trade mark), and such like. The Web service adapter 20 also has a SOAP interface (encapsulated within a WSDL) that matches the SOAP interface of the client object application 18. Thus, the same client object 18 can be used with any CRM server, only the adapter 20 needs to be changed to accommodate the specific API of the new CRM server.

Associated with the CRM server 24 is a relationship database 26 containing information on currently available advertising campaigns, as well as personal information relating to users of the ATM network. This personal information can be supplied via various different channels.

As shown in FIG. 1, the CRM server 24 can be accessed via a number of different channels 28, for example using a PC to gain on-line access, whether in a consumer's home or in a banking environment, or by telephone. In the latter case, although consumer access is via telephone, it will be appreciated that there is some form of PC interface to the CRM server. It should be noted that although in FIG. 1 the web server 22 and the CRM server 24 are shown as being physically separate, this is a logical separation and both of these may be provided on the same machine.

The client application 18 in the ATM exposes the web service adapter to the ATM control application 16 to enable the ATM 10 to access the CRM server functionality. The web server adapter 20 is operable to receive messages from the CRM server 24 in a standard CRM format, extract relevant information from the CRM messages, and translate the extracted information into a format that can be recognized by the client application 18.

No presentational information is passed between the web service adapter 20 and the client application 18, so that all responsibility for the presentation, format and layout of any information that is ultimately shown on the ATM screen lies with the ATM 10 itself, as does all responsibility for soliciting and obtaining a user response.

In preferred embodiments, the responsibility for the presentation of information lies with the ATM application 16, although it may alternatively be provided by functionality within the client application 18. This is in direct contrast to other currently available mechanisms for accessing CRM systems in which the CRM data defines the exact layout and format of the information that is to be presented.

To control communication between the ATM 10 and the CRM server 24 a new protocol or language having a series of messages is defined. These messages relate to three separate sets of overall system functionality. These are: (i.) session management, (ii.) campaign management, and (iii.) personalization.

Session management messages are generated by the client application 18 to notify the CRM server 24 when a particular consumer is using the associated ATM. The session management message can either indicate that a session is being started or alternatively the session is being closed.

Figure 2:
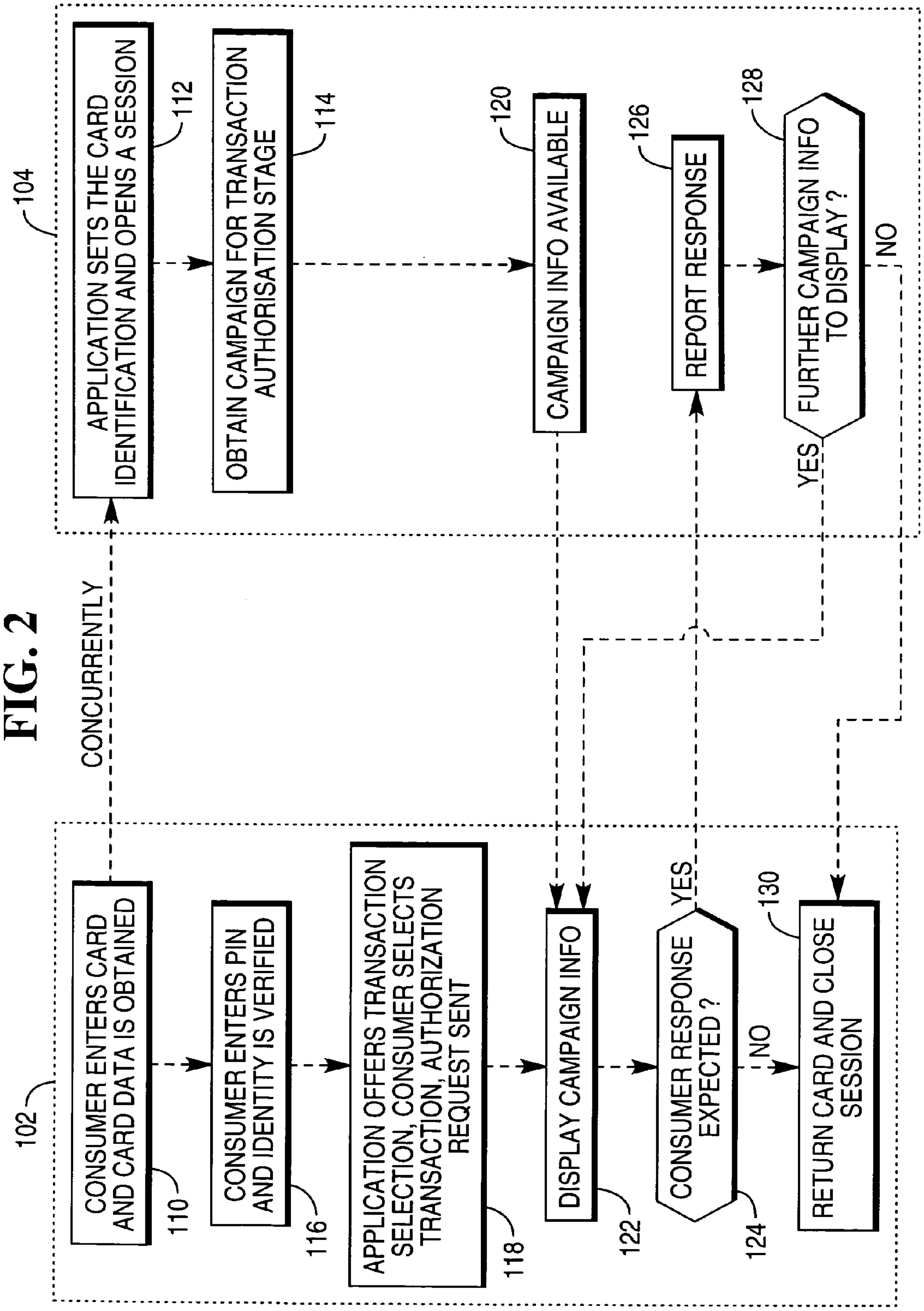
FIG. 2 is a flow diagram illustrating steps involved in a targeted campaign transaction at the ATM of FIG. 1.

Reference is now also made to FIG. 2, which illustrates steps implemented by both the ATM control application 16 (illustrated by area 102) and the client object 18 and adapter 20 (illustrated by area 104) during a transaction at the ATM 10.

Typically, a user is uniquely identified, for example, by insertion of their bank-card into the ATM (step 110), which causes a start session message to be sent (step 112) from the client application 18 to the web server adapter 20. This causes the web server adapter 20 to send a message to the CRM server 24 (step 114), as described in more detail below, to identify whether any campaign information is available for presenting to the consumer in question. The transaction flow at the ATM (that is, the sequence of screens presented to the user) continues simultaneously with the operation of the client object 18 and adapter 20.

In preferred embodiments, the start session message is generated while the user is entering their personal identification number (PIN) so that the CRM server 24 has an advance warning of how to react to the customer.

Once the user's PIN is entered, a signal is sent by the ATM 10 to the host 12 requesting authorization (step 116). In the event that authorization is received the ATM allows that customer to proceed through various transactional steps (step 118). Typically the first of these steps is selection of the required transaction, for example, withdrawal of cash or a statement or other such financial service. Once the user selects a particular service this sets in motion a series of steps that have to be carried out by the ATM and/or by the host. In a typical ATM transaction, a time-delay is associated with each of these steps. For example, in the case of a cash withdrawal transaction, the user is typically asked to enter the required amount, then a message is sent from the ATM 10 to the host 12 requesting authorization for dispensing that amount. Typically, it can take a matter of seconds for an authorization response to be received from the host. Such a delay in providing information to a customer can be advantageously used to present additional information to them, such as advertising information.

To enable additional information to be presented to the user, a GET campaign request is generated by the client object 18 for sending to the CRM sever 24 either once the user has been identified or once the user has made a particular transaction selection.

Figure 3:
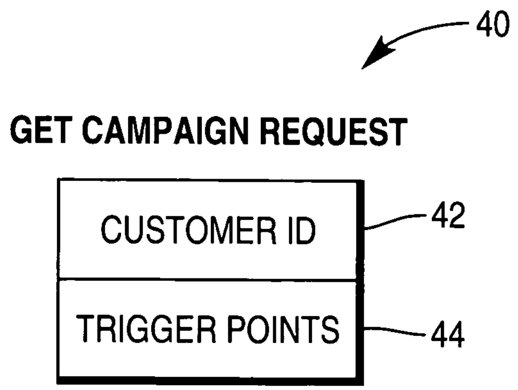
FIG. 3 is a diagrammatic representation of a GET campaign request generated by the client application in the ATM of FIG. 1.

FIG. 3 shows an example of a GET campaign request 40. This includes an identifier 42 for the particular customer and a list of triggers 44. The triggers 44 identify when there is "dead time" on the screen during which campaign information can be displayed, such as the time between entering a requested amount of cash and authorization from the host described previously.

The triggers 44 can be identified with reference to the transaction selected. To achieve this, the ATM stores a list of available transactions and trigger points associated with those transactions. Hence when a customer selects a particular transaction, the client application 18 can immediately identify trigger points merely by referring to the stored list.

The GET campaign request is generated by the client application 18 and forwarded to the web server adapter 20. This causes the web server adapter 20 to interrogate the CRM server 24 to construct a GET campaign response.

This GET campaign response may indicate that there is no campaign information available for that particular customer at present, referred to as a null response. This null response may be generated in circumstances where the CRM server 24 has determined that presenting advertising material information to the customer is inappropriate. For example, the CRM server 24 may be programmed to limit the number of times a consumer is presented with advertising information. As a specific example, the CRM server 24 may be programmed to provide campaign information during one out of every five transactions. This is advantageous because many consumers do not wish to be bombarded with unwanted or unsolicited advertising material.

Figure 4:
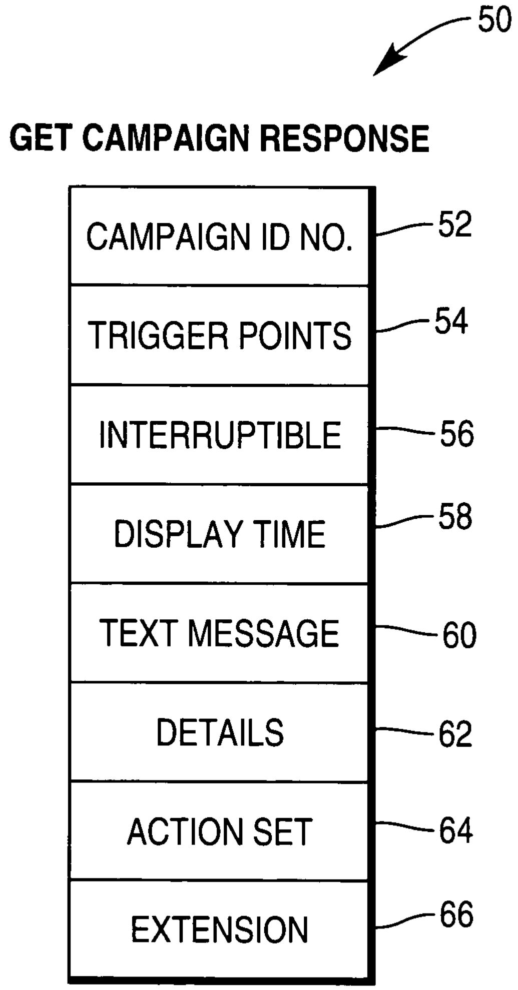
FIG. 4 is a diagrammatic representation of a GET campaign response generated at the web adapter of FIG. 1.

In the event that campaign information is currently available for the consumer a GET campaign response is generated at the web server adapter 20 using information provided by the CRM server 24 and received by the client application 18 (step 120). FIG. 4 shows the structure of the GET campaign response 50. This includes a campaign identification number 52 so that the particular campaign being pushed to the consumer can be recorded and identified. It also includes a trigger field 54 for indicating the trigger point or points at which the campaign information is to be presented. The trigger points are identified by the GET campaign request. Also included in the campaign response is an interruptible field 56, which indicates whether or not the campaign information should be interrupted by the other functionality of the ATM. Typically this will merely be a true/false flag with true indicating that the campaign information is interruptible and false indicating that it is not interruptible. This information is required because the CRM has no control over the presentation of the information. Hence if the ATM is waiting for a host authorization signal, which may take about 30 seconds, the ATM may wish to start running the campaign information. It should, however, be noted that since the CRM has no control over the presentation of information the interruptible field merely gives a recommendation to the ATM as to whether or not the campaign information can be interrupted. Ultimately the final decision on what happens to the information that is being presented is taken by the ATM software.

Associated with the interruptible field is a display time field 58. This includes a display time that the CRM recommends for the campaign information to be presented. In general, where customer feedback is requested, the display time will tend to be higher. Again, however, ultimately the ATM controls presentation format and time, so the CRM display time is merely provided as a guide. Another field provided in the GET campaign response is the text message field 60. This includes the core of the information that is to be displayed on the ATM screen. Because of the limited screen size and resolution of the ATM this is usually a relatively simple message including a few words such as "Interested in a loan for a car?". It should be noted that the text message contains the text only and does not include any reference to font size, font, style, positioning, or other format information.

The next field is the details field 62. This may include an identifier for a graphics file, which is stored in the ATM 10. In the event that such an identifier is included, the ATM 10 is operable to retrieve the file and generate and display the desired graphic.

Yet another field is the action set field 64. Four standard options are available for this at present, positive, negative, defer, and timeout. This information defines interactive options that are available to a user. It should be noted however that the terms used in the action set are not generally used on the ATM screen. Instead, all information presented on the screen, and the controls required to select options or enter selections (such as the function display key assignments, encrypting keypad assignments, soft-key assignments if a touchscreen is used), are determined by the ATM. For example, the ATM may generate a 'yes' button or 'no' button on the screen to correspond to the positive and negative fields respectively of the action set. The defer option can be useful to indicate whether or not a user would like to see the information again at a later date. The timeout field defines a maximum display time; after this time has elapsed, the campaign information is removed from the screen.

The timeout option, although not presented on the ATM screen, is useful for the CRM server 24. For example, if a timeout occurs, this may indicate that the customer was unable to interpret the information provided in the time available. This may provide useful feedback on the level of complexity of the information presented. In the event that the timeout time is exceeded in many cases, this would indicate to the CRM server that the information is too complex for the average ATM user. The CRM system can then react to this information, for example by using another channel (for example, email, Web banking interface, or such like) to send the information to the user.

In this embodiment, an extension field 66 is provided so that the action set can be customized to include further options if and when desired. This field 66 is left empty so that extra logic can be added into the response, for example, to allow specific banks or other interested parties to customize the services available.

When the GET campaign response is received at the ATM 10 (step 120) the client application 18 interprets the GET campaign response to determine if and when any campaign information should be presented to the user. In the event that the campaign information should be presented to the user, for example, in the delay before receiving the host authorization for a financial transaction, the client application 18 informs the ATM control application 16 and exposes the campaign information to the ATM control application 16 in a pre-defined format, which takes the form of properties. These properties are a sub-set of the fields in the Get campaign response 50, namely, fields 54 to 66. When the request for authorization signal is generated by the ATM 10, the ATM control application 16 renders this information to a format suitable for display on the ATM and causes the ATM 10 to present the campaign information (step 122).

If the action set indicates that a customer response is required, as part of the campaign information, the ATM displays interactive options such as "yes" and "no", and selects the keys and key strokes that are to be used to allow a user to respond. It is contemplated that these interactive options are presented to a user while the ATM is waiting for authorization for a transaction, or while cash is being counted by a cash dispenser in the ATM, or when notes or other media items are being validated by a deposit module in the ATM.

In the event that these interactive options are presented and a customer responds by making an appropriate selection (step 124), a GET consumer response message is generated by the client application 18 (step 126). This message is forwarded to the CRM server 24 via the web service adapter 20.

Included in the consumer response is a consumer action signal, including the trigger that was associated with the campaign and the customer response. When this signal is received by the CRM server 24 there are three options. In each case, however, a response is provided from the CRM server to the client application 18 (step 128).

The first option is that the CRM merely generates an acknowledgment signal, which is sent via the web service adapter 20 to the client application 18. The ATM control program 16 can then decide whether or not to display this acknowledgement.

The second option is that a subsequent campaign is returned to the client application 18 to provide additional information to the consumer. For example, this could be a simple message such as 'we will send you information in the post'.

The final option is that the CRM response includes other action sets so that another interactive screen is presented at the ATM to the user. In the event that this third option is implemented it will be appreciated that a dialogue between the ATM user and the CRM server 24 can be established.

When the transaction is completed, the bank-card is returned to the user and the client object 18 prepares and sends a close session message to the adapter 20 (step 130).

In use of the system of FIG. 1, the user starts a session by entering his bank-card into the ATM. This causes the client application 18 to generate a session message, which is sent to the adapter 20, which in turn notifies the CRM server 24 that a session is starting at that particular ATM 10. Then, once the user has entered their PIN, this allows them to be identified. The user then selects the financial services required in the same way as at a conventional ATM. At this stage, a GET campaign request message is generated by the client application 18, which message identifies the user and includes one or more trigger points associated with the transaction selected by the user.

This message is sent to the adapter 20, which in turn sends a signal to the CRM server 24 requesting information for the user and indicating the time slots available for displaying that information. The CRM server 24 responds by either saying that no campaign information is available or a response that includes a campaign number, triggers points, an indication of whether the campaign is interruptible; a recommended display time; a text message that is to be presented; details of any graphics, and an action set.

The web adapter 20 uses the information from the CRM server 24 to construct a GET campaign response. This is then sent to the client application 18 at the client terminal 10. The client application 18 provides the information received in the GET campaign response to the ATM control application 16, which determines whether or not to present the campaign information. In the event that the information is to be presented, the ATM control application 16 determines the format and layout of that information.

Figure 5:
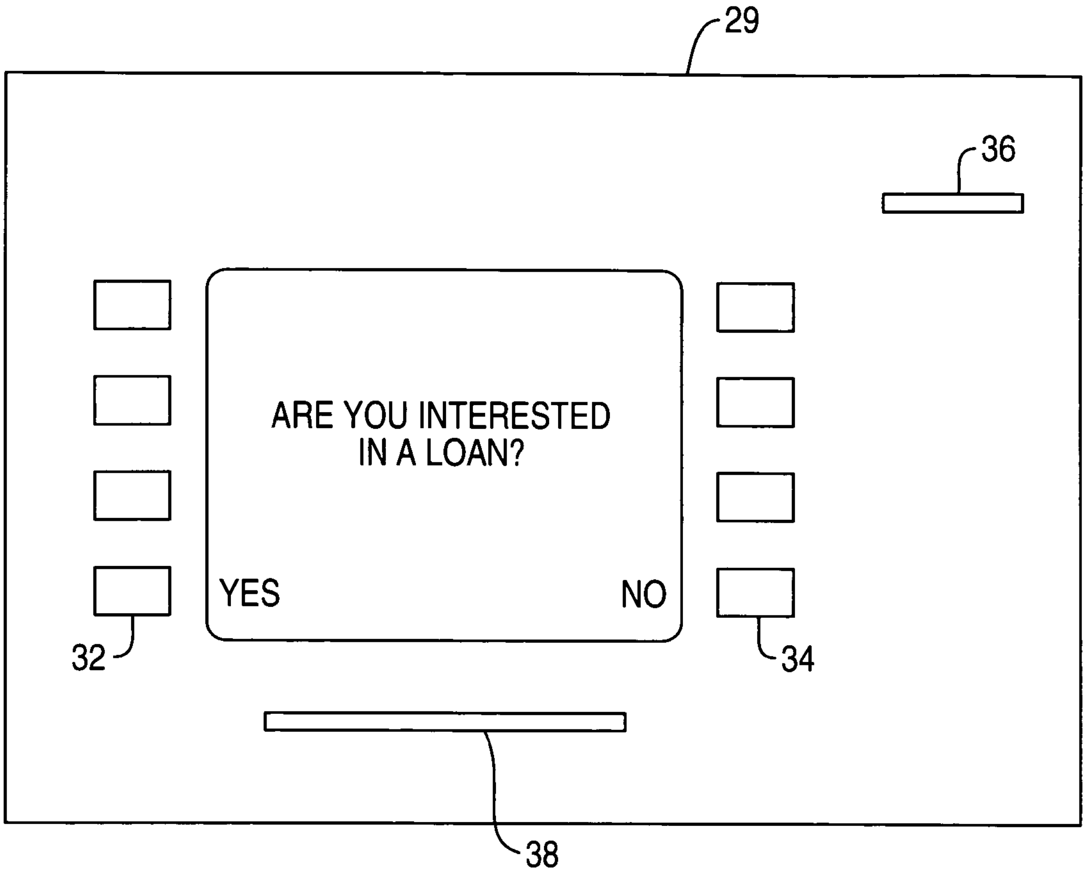
FIG. 5 is a partial front view of the ATM of FIG. 1, in which information derived from the CRM server is presented to the user.

As a specific example, consider a GET campaign response that indicates that the campaign information should be presented in the time between requesting and receiving a cash withdrawal; the campaign is interruptible; the recommended display time is 5 seconds; the text message is "Are you interested in a loan?"; there are no details and so no associated graphics; and the action set is positive or negative. In this case, the client application 18 provides the information and the ATM control application 16 can choose whether to follow the CRM recommendations. In the event that the ATM control application 16 does elect to present this to the user, then a suitable screen, such as that shown in FIG. 4 is displayed to the user for 5 seconds, in the period between the request for cash and receipt of that cash. However, if the ATM control program determines that 5 seconds is too long, for example, because the ATM is in continuous use, indicating that there is a queue of people waiting to use the ATM, then the ATM control program may only display the screen for four seconds. FIG. 5 shows a simplified schematic diagram of a front fascia 29 of an ATM having a display 31, and various user input buttons in the form of function display keys (FDKs) associated with the display. The fascia defines a card entry slot 36 for receiving a user's bank-card, a cash dispensing slot 38 and. As can be seen from FIG. 4, the ATM has selected two FDKs 32 and 34 for receiving a user response. Pressing the first FDK 32 indicates that the user wants more information, and pressing the second FDK 34 indicates that the user does not want any more information. In either case, a suitable consumer action signal is constructed by the client application 18 and sent to the adapter 20.

It will be appreciated that there are two logical communication channels: the first is between the ATM control program 16 and the host 10; the second is between the client application 18 and the adapter 20. These two logical channels may share the same physical connection, or may use different physical connections.

Where different physical connections are used, the communications between the client application 18 and the adapter 20 are typically in SOAP format; whereas, the communications between the ATM and the host 12 are typically in non-HTTP format, such as NCR (trade mark) NDC format, Diebold (trade mark) 91X format, or such like.

One or both of the logical communication channels may be implemented using a dial-up network connection.

Personalization Example

Figure 6:
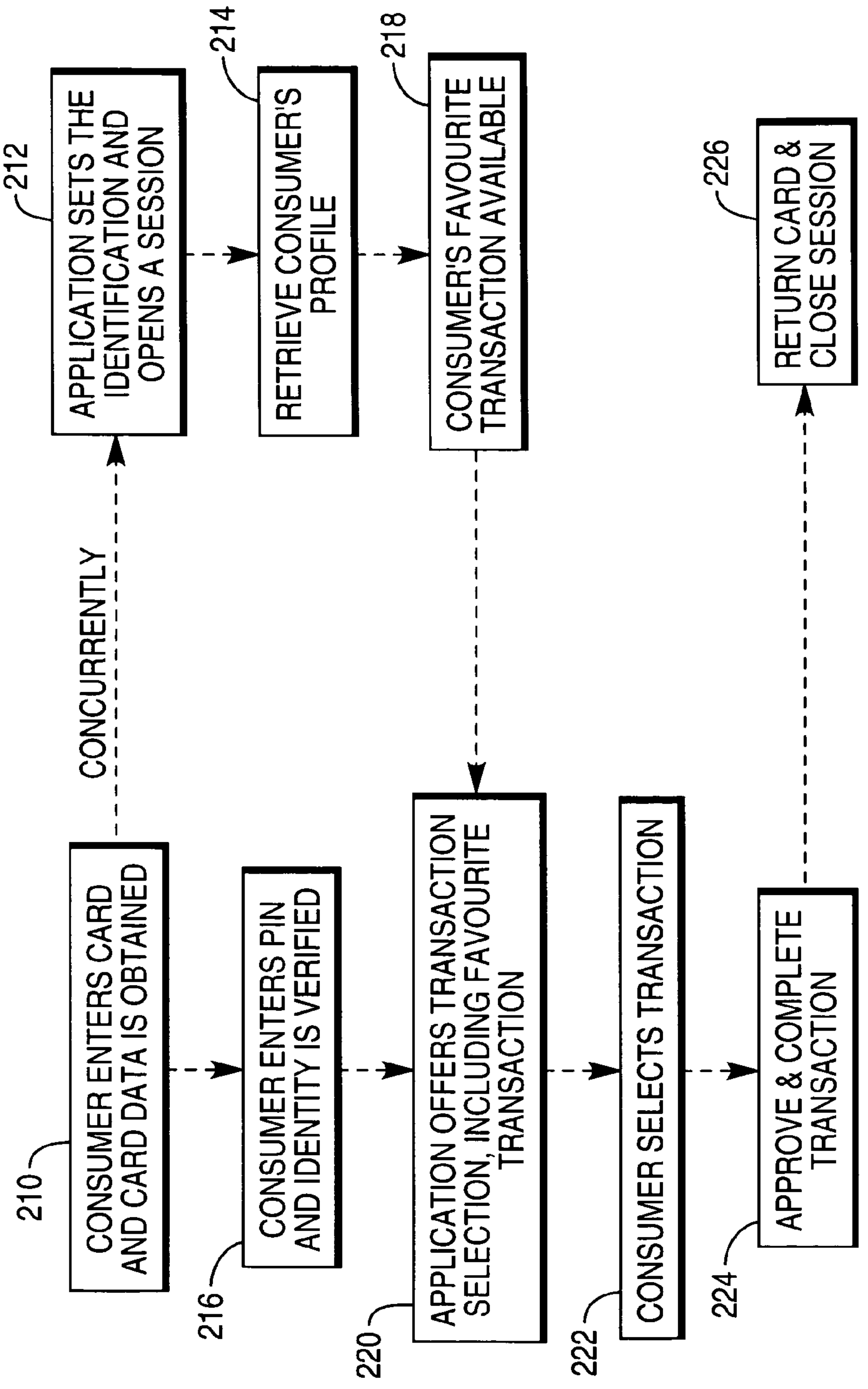
FIG. 6 is a flow diagram illustrating steps involved in a personalized transaction at the ATM of FIG. 1.

As well as providing campaign information, the functionality provided at the CRM server 24 can be used to personalize a user's ATM experience. FIG. 6 is a flow diagram illustrating steps involved in a personalized transaction at the ATM of FIG. 1.

To provide a personalized transaction, when the user inserts their card, personal information provided on the CRM can be used to customize the screen that is presented. For example, this personalization could include presenting the user's name on the screen. The name presented could be a moniker, that is a personalized name or a nickname. The retrieved profile could also indicate the customer's favorite transaction. For example, the customer may prefer to withdraw cash or use a fast cash option or may only use ATMs for obtaining their financial statements. In any event if a customer profile is available it can be used by the ATM to personalize the screen that is presented.

To build a user profile, various options are available. For example, the customer could provide the information to the CRM server 24 by telephone or by a home banking channel. Alternatively, the user may enter the information via the ATM itself. In particular, at the end of a given transaction, the ATM may present an option "do you wish this to be your favorite transaction". In the event that the answer to this is "yes", this transaction is added to the user's response profile. Associated with each transaction may be an "Is Favorite Supported" field. The answer to this may be "yes" or "no". This is useful because banks may wish to prohibit users from making certain transactions favorite. For example, this may be done where a transaction takes too long to execute.

Referring to FIG. 6, a user inserts his bank-card (step 210); in response to this, the client object 18 prepares and sends a start session message (step 212) to the adapter 20, where the start session message includes the bank-card identification information.

When the Web services adapter 20 receives this start session message, it sends a message to the CRM server 24 (step 214) to determine if there is a stored profile for this user (which may include a favorite transaction option).

While this occurs, the ATM 10 continues to present the transaction flow to the user, so the user enters his PIN (step 216).

When the adapter 20 receives the user's profile from the CRM server 24, the adapter sends this to the client object 18 over the SOAP interface (step 218).

The client object 18 exposes this information to the control application 16 using the pre-defined methods and properties interface. One of the properties is a "FavouriteTransaction" property, defining the user's favorite transaction. The "FavouriteTransaction" property includes details of the transaction type and value.

The ATM control application 16 reviews this property information and determines whether to present it to the user as part of the transaction options screen in the transaction flow.

In this example, the ATM control application decides to present the favorite transaction to the user, so the ATM control application 16 incorporates the favorite transaction option into the transaction options screen, assigning the favorite transaction option one of the FDKs (step 220).

The ATM control application 16 then monitors the user's selection (step 222), which may be the favorite transaction, and executes the selected transaction (step 224) either immediately (if the favorite transaction was selected) or after receiving any further input from the user (if a cash withdrawal or other transaction was selected).

When the transaction has been fulfilled, the ATM control application 16 returns the card to the user (step 226), and the client object 18 prepares and sends a close session message to the adapter 20.

Once a user has entered a transaction, the ATM control application 16 may present a question to the ATM user on the ATM display asking the user if he/she would like the ATM to remember the transaction that has just been entered and to store that transaction as the user's favorite transaction.

If the user selects a button indicating that the user would like to store the transaction as his/her favorite, then the ATM control application 16 passes this information to the client object 18, which sends the information to the adapter 20 to update the CRM server 24 with this information.

Thereafter, when the user conducts a transaction at an ATM connected to the CRM server, the favorite transaction option may be presented to the user. If the favorite transaction option is presented, it will relate to this newly-stored transaction.

The system in which the invention is embodied can be implemented in a simple and non-intrusive manner, and can be easily adapted to allow communication between existing ATM networks and existing CRM resources. To do this, a web adapter has to be devised to allow communication between the CRM and the ATM networks. Web service adapters or interfaces and methods for devising such adapters or interfaces are well known and so will not be described herein.

Each ATM in the network also has to be provided with a client application 18 that can interpret the messages received from the web server adapter and generate suitable responses. The client applications can be downloaded to the ATMs over any suitable network connection or may be installed by service personnel. In any case, setting up a system to allow communication between a network of ATMs and an existing non-dedicated CRM network is possible. In this way, there is provided a non-platform dependent system and method for establishing a client/server dialogue, and in particular a system and method for allowing an ATM to access functionality provided by a conventional CRM network that would otherwise be unavailable.

A skilled person will appreciate that variations of the disclosed arrangements are possible without departing from the invention. For example, although the ATM is described as being configured to display information from the CRM server on-screen, where the terminal includes a printer (not shown), the information could additionally or alternatively be printed onto a suitable medium such as paper and provided as a print-out. As a specific example, CRM information may be printed onto a transaction receipt, together with financial information derived from the host terminal. Accordingly, the above description of a specific embodiment is made by way of example only and not for the purposes of limitation. It will be clear to the skilled person that minor modifications may be made without significant changes to the operation described. It will also be clear to the skilled person that the client application could be used on a non-cash kiosk, or other types of public access terminals at which users can conduct transactions or request information.

What is claimed is:

1. A client application used in a self-service terminal including a processor, and a control application controlling communication with a host, presentation of information on a display in a sequence of screens as part of a transaction flow, and response to user keystrokes, the client application including a set of instructions executable by the processor, the client application comprising:

a service provider server interface communicating with a service provider server to retrieve information for presentation to a user of the terminal, said communicating occurring concurrently during presentation of the sequence of screens;

a control application interface communicating with the control application executed on the self-service terminal; and the service provider server interface and the control application interface controlling communication between the control application and the service provider server for controlling of presentation of information to the control application by exposing information in a pre-defined format which takes the form of properties thereby preserving the ability of the control application to determine what information should be presented based on the exposed properties, and enabling the control application to retain full control of what information is displayed and the format in which information is displayed.

2. A client application according to claim 1, wherein the service provider server interface comprises a web services interface implementing a simple object access protocol.

3. A client application according to claim 1, wherein said properties include text for display, and a recommended time for display.

4. A client application according to claim 3, wherein said properties further include a recommendation for whether the presentation of the information should be interruptible.

5. A client application according to claim 1, further comprising means for sending via the service provider server interface a session management message providing notification of when a particular customer is using the self-service terminal.

6. A self-service terminal comprising:

a control application, executed on the self-service terminal, for controlling the terminal's transaction flow including presentation of information as a sequence of screens on a display to a user;

a client object for concurrently obtaining information for presentation to a user during the transaction flow and notifying the control application of availability of the information;

a first interface for communicating with an external service provider server to retrieve information for presentation to the user; and a second interface between the control application and the client object;

the client object parsing information from the external service provider which is incomprehensible by the control application to extract relevant information and translating extracted information into a pre-defined format comprising properties comprehensible by the control application thereby allowing the control application to determine what information should be presented based on the exposed properties, and to retain full control of what, if any, information is presented and how the information is presented.

7. A system for presenting information which is targeted to a particular user at a self-service terminal, the system comprising:

a self-service terminal including a control application for receiving information in a first format and displaying a transaction flow as a sequence of screens on a display;

a service provider server for providing services in a second format which is incompatible with the first format;

an adapter in communication with the service provider server and for transforming information from the second format used by the service provider server to a third format; and a client object in communication with the adapter and mediating information transfer between the service provider server and the control application for (i) receiving information in the third format and (ii) exposing properties of the information to the control application in the first format such that the control application can receive information from an external source originating in a different format while retaining full control of what information is displayed to the user, the client object mediating information transfer concurrently during said transaction flow.

8. A system according to claim 7, wherein (i) the first format is a set of objects and methods, (ii) the second format is a proprietary format, and (iii) the third format is a Web-services format.

9. A system according to claim 8, wherein the third format is defined by a simple object access protocol.

10. The client application of claim 1 further comprising the control application uniquely identifying a particular user when the particular user inserts an identification card into the self-service terminal, and in response, the client application causes a start session message to be sent to the service provider server.

11. The client application of claim 1 further operating to generate a get campaign request.

12. The client application of claim 11 wherein said get campaign request includes triggers identifying when dead time is available on the display of the self-service terminal between transaction flow related displays.

* * * * *